United States Patent
El Hajje et al.

(10) Patent No.: US 11,245,352 B2
(45) Date of Patent: Feb. 8, 2022

(54) FLOATING PHOTOVOLTAIC MODULE

(71) Applicant: ELECTRICITE DE FRANCE, Paris (FR)

(72) Inventors: Gilbert El Hajje, Neuilly-sur-Seine (FR); Matthieu Chiodetti, Fontainebleau (FR); Remi Le Berre, Episy (FR); Frederik Vael, Sint Amandsberg (BE)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 16/769,776

(22) PCT Filed: Dec. 5, 2018

(86) PCT No.: PCT/EP2018/083671
§ 371 (c)(1),
(2) Date: Jun. 4, 2020

(87) PCT Pub. No.: WO2019/110672
PCT Pub. Date: Jun. 13, 2019

(65) Prior Publication Data
US 2020/0389120 A1 Dec. 10, 2020

(30) Foreign Application Priority Data
Dec. 7, 2017 (FR) .................... 17 61770

(51) Int. Cl.
*H02S 10/40* (2014.01)
*H02S 20/32* (2014.01)
(Continued)

(52) U.S. Cl.
CPC ............. *H02S 10/40* (2014.12); *B63B 35/44* (2013.01); *H02S 20/32* (2014.12); *H02S 30/10* (2014.12);
(Continued)

(58) Field of Classification Search
CPC .......... H02S 10/40; H02S 20/32; H02S 20/00; H02S 30/10; H02S 40/22; H02S 40/425; B63B 35/44; Y02E 10/52
See application file for complete search history.

(56) References Cited

U.S. PATENT DOCUMENTS

| 4,296,731 A | 10/1981 | Cluff |
| 4,771,764 A * | 9/1988 | Cluff ....................... H02S 20/32 126/577 |

(Continued)

FOREIGN PATENT DOCUMENTS

| CN | 206 629 012 U | 11/2017 |
| FR | 2 954 000 B1 | 1/2012 |

(Continued)

OTHER PUBLICATIONS

Examination Report issued in related application IN 202017027910, dated Mar. 15, 2021, 5 pages.

*Primary Examiner* — Tamir Ayad
(74) *Attorney, Agent, or Firm* — Faegre Drinker Biddle & Reath LLP

(57) ABSTRACT

A floating module for producing electricity, comprising: at least one photovoltaic panel, and a floating framework on which the panel is mounted, wherein the photovoltaic panel comprises an upper face and a lower face which are capable of generating electricity by photovoltaic effect, and wherein the floating module further comprises a reflective device capable of reflecting light rays towards the lower face of the panel, the reflective device comprising a plurality of floating reflective balls and/or a tarpaulin which is attached to the framework.

17 Claims, 4 Drawing Sheets

(51) Int. Cl.
*H02S 30/10* (2014.01)
*H02S 40/22* (2014.01)
*B63B 35/44* (2006.01)

(52) U.S. Cl.
CPC ...... *H02S 40/22* (2014.12); *B63B 2035/4453* (2013.01)

(56) References Cited

U.S. PATENT DOCUMENTS

| | | |
|---|---|---|
| 9,012,765 B2 | 4/2015 | Sanzone et al. |
| 2006/0090789 A1 | 5/2006 | Thompson |
| 2008/0230047 A1* | 9/2008 | Shugar ................ F24S 25/617 |
| | | 126/569 |
| 2009/0120486 A1 | 5/2009 | Buller |
| 2015/0020865 A1* | 1/2015 | Xiao ................ G02B 19/0042 |
| | | 136/246 |
| 2016/0059938 A1* | 3/2016 | Momayez ............... B63B 35/50 |
| | | 440/6 |
| 2016/0141437 A1 | 5/2016 | Asbeck |
| 2017/0370621 A1* | 12/2017 | Port ..................... B63B 35/44 |

FOREIGN PATENT DOCUMENTS

| | | |
|---|---|---|
| KR | 10-1721372 B1 | 4/2017 |
| WO | 2014/005626 A1 | 1/2014 |

* cited by examiner

FLOATING PHOTOVOLTAIC MODULE

CROSS-REFERENCE TO RELATED APPLICATIONS

This application is the U.S. national phase of the International Patent Application No. PCT/EP2018/083671, filed Dec. 5, 2018, which claims the benefit of French Patent Application No. 17 61770, filed Dec. 7, 2017, the entire content of which is incorporated herein by reference.

FIELD

The disclosure relates to a floating module for producing electricity with the aid of photovoltaic panels, and to a power station comprising several modules.

BACKGROUND

Floating photovoltaic systems which comprise one or more photovoltaic panels mounted on a floating framework are known. These systems are perceived as being advantageous, in particular compared to conventional photovoltaic systems (meaning those installed on the ground or on buildings), for several reasons.

On the one hand, the presence of water in the immediate environment of the photovoltaic system allows natural cooling of the panels and therefore an increase in efficiency. In addition, a floating photovoltaic system can bring benefits to its environment because, by blocking some of the light reaching the water, it can limit unwanted algae growth or evaporation, for example in a lake.

As an example, document US2006/0090789 discloses a floating photovoltaic module, which comprises a tubular framework comprising cylindrical flotation elements and connector tubes to other identical structures. On this framework are arranged photovoltaic panels comprising a single face provided with photovoltaic cells, this face being directed towards the sky.

This type of structure has limited effectiveness, which cannot be increased by the use of two-sided panels since the water reflection coefficient, of about 7%, is too low to justify the additional cost associated with such panels.

Document US2009/0120486 is also known, which describes two-sided photovoltaic panels which are arranged parallel to the surface of the ground, on which a reflective coating is arranged. This structure is also limited from an efficiency point of view, for several reasons.

On the one hand, no system for cooling the panels is described, therefore one can predict a significant increase in the temperature of the panels related to the direct light and the reflected light, which tends to reduce their efficiency.

Also, in order to allow sufficient light to reach the reflective coating, the panels are positioned at a distance from each other, which increases the surface area required by this system.

SUMMARY

In view of the above, disclosed embodiments aim to at least partially overcome the disadvantages of the prior art.

In particular, disclosed embodiments aim to provide a photovoltaic facility having increased efficiency compared to the prior art.

Another aim of the disclosed embodiments is to propose a facility having a reduced footprint.

In this regard, in an embodiment there is a floating module for producing electricity, comprising:
  at least one photovoltaic panel, and
  a floating framework on which the panel is mounted, characterized in that the photovoltaic panel comprises an upper face and a lower face which are capable of generating electricity by photovoltaic effect, and in that the floating module further comprises a reflective device capable of reflecting light rays towards the lower face of the panel, the reflective device comprising a plurality of floating reflective balls and/or a tarpaulin which is attached to the framework.

The floating framework of the floating module may comprise a plurality of tubular elements connected to one another so as to define at least one closed cell in which the floating reflective balls are then arranged, the framework further being capable of retaining said balls within the cell.

In embodiments where the reflective device comprises at least one tarpaulin attached to the framework, the tarpaulin is preferably reflective.

In one embodiment, the tarpaulin is stretched over the framework so as to extend above the surface of the water when the module is placed on the water. Alternatively, the tarpaulin is shaped to receive a ballast of water, and the reflective device further comprises a plurality of floating reflective balls contained by edges of the tarpaulin and/or by the floating framework.

Advantageously, but optionally, the floating module may further comprise a sun azimuth tracking device, capable of rotating the module or the panel according to the azimuth of the sun.

Preferably, each photovoltaic panel extends at an angle between 0 and 40° relative to the horizontal, and preferably at an angle between 25 and 35° relative to the horizontal.

The disclosure also relates to a photovoltaic power station, comprising a plurality of floating modules according to the above description.

The floating module according to an embodiment has a high efficiency. Indeed, the use of two-sided photovoltaic panels and a reflective device on a floating module makes it possible to preserve the advantages related to a floating module (natural cooling, evaporation reduction, etc.) while increasing the efficiency of a conventional photovoltaic barge.

In some embodiments, the reflective device comprises floating reflective balls, contained by a tarpaulin or cross members stiffening the framework. The spherical nature of the balls allows obtaining a diffuse reflection of the incident light, therefore a better distribution of the reflected light on the lower face of the panels.

In certain embodiments, the reflective device comprises a tarpaulin attached to the framework, this tarpaulin being able to be stretched above the water or to receive a ballast of water. This stabilizes the module, which gives it good efficiency and a long service life.

In the case where the tarpaulin is reflective, the mechanical stabilization and optical reflection functions are achieved simultaneously without generating additional costs.

In the case where the floating module further comprises a sun azimuth tracking device, the production of electrical energy in a day is maximized.

BRIEF DESCRIPTION OF THE DRAWINGS

Other features, objects and advantages of the disclosed embodiments will emerge from the description which follows, which is purely illustrative and non-limiting, and which is to be read with reference to the appended drawings in which.

DETAILED DESCRIPTION

Figure 1:
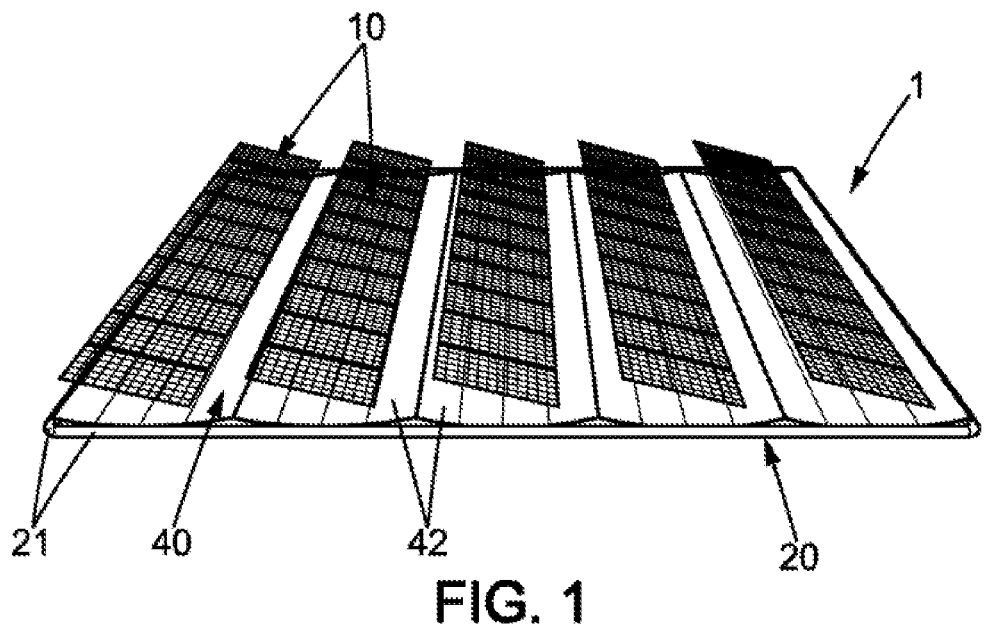
FIG. 1 represents an example of a floating module according to a first embodiment.
Figure 3:
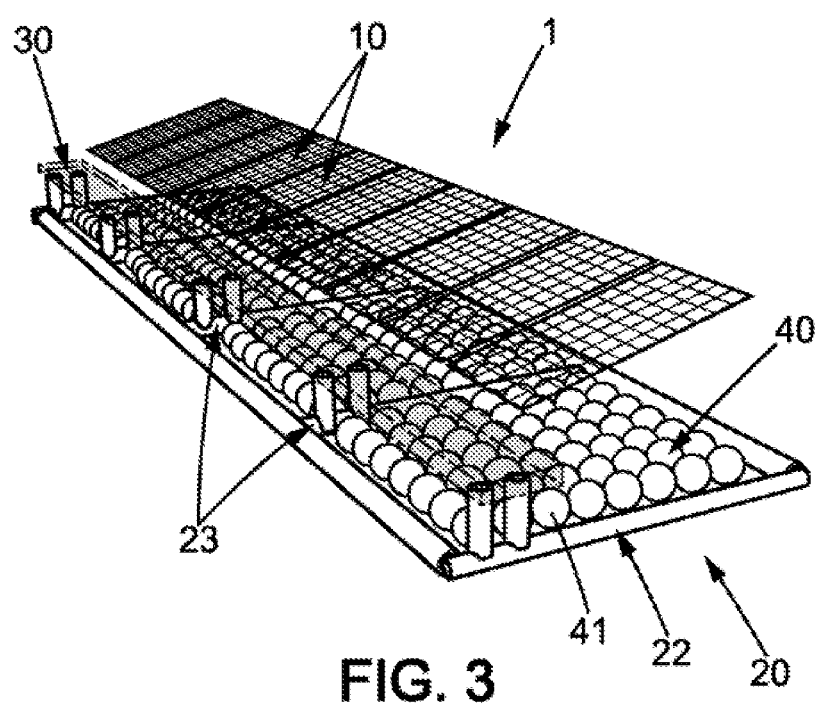
FIG. 3 represents an example of a floating module according to a third embodiment.

Referring to FIGS. 1 to 3, we will now describe a floating module 1 for producing electricity according to different embodiments.

The floating module 1 is suitable for installation on an aquatic surface. This surface may for example be a lake, natural or artificial, a pond, or even the surface of the sea, preferably in a location with little exposure to waves and currents for example such as a port, a cove, a lagoon, etc.

The floating module 1 comprises at least one, and preferably several two-sided photovoltaic panels 10, for example up to ten two-sided photovoltaic panels 10. "Two-sided photovoltaic panel" is understood to mean a panel covered on two surfaces with photovoltaic cells suitable for generating electricity from photons by photovoltaic effect. In the current case, the surfaces covered with photovoltaic cells are opposite one another, and comprise a so-called upper face 11 which is directed towards the sky in order to receive light directly from the sun, and a so-called lower face 12 (referenced in FIG. 2b) which is directed towards the aquatic surface on which the module is placed, so as to receive photons reflected on this aquatic surface or on other reflective elements arranged on this surface, as described in detail below.

Advantageously, each photovoltaic panel 10 extends within a plane which forms an angle between 0 and 40° relative to the plane of the aquatic surface. Preferably, this angle is between 25 and 35° for better photovoltaic conversion efficiency. Indeed, below 25°, the Preferably, this angle is 30°, which corresponds to the position of maximum photovoltaic conversion efficiency.

The floating module 1 further comprises a floating framework 20, on which are mounted the photovoltaic panel or panels 10. This floating framework advantageously comprises a plurality of rectilinear and/or curvilinear tubular elements 21 suitable for being assembled. To enable the module to float, the floating framework is preferably made of a light material such as, but not limited to, polyethylene.

According to a preferred embodiment, the tubular elements connected to each other define at least one closed cell. For example, the framework may define a square or rectangular frame 22. As a variant, the framework may also comprise one or more cross members 23 within the frame, defining, with the tubular elements forming the frame 22, several closed cells 24 (see FIG. 2a).

This structure comprising one several closed cells gives good stability to the module 1. To further increase this stability, the photovoltaic panels 10 carried by the framework advantageously do not extend beyond the cell or cells defined by the framework 10, in other words they are contained within a volume whose lateral edges are defined by the framework, as is the case in FIGS. 1 to 3.

As a variant, other forms of framework may be created by the assembling of the tubular elements, such as for example a cross.

Advantageously, but optionally, the floating module 1 may also comprise a platform 30 for accessing the panels 10, this platform being mounted on the framework 20. Such a platform is shown for example in FIG. 3. To preserve the buoyancy of the module, the platform 30 is preferably made of grating, in other words in the form of a lattice or grid. This platform is advantageously removable, to be installed only in a context of maintenance and repair operations.

The floating module 1 further comprises a reflective device 40, this device being suitable for increasing the albedo of the aquatic surface on which the module is positioned.

In this manner, the amount of incident light reflected towards the lower face of the photovoltaic panels is greater than in the absence of the reflective device.

FIGS. 1 to 3 illustrate different embodiments of this reflective device.

According to an embodiment represented in FIG. 3, the reflective device 40 comprises floating reflective balls 41. The balls are arranged on the aquatic surface, within each cell defined by the floating framework 20, and the framework 20 is advantageously shaped to contain the beads in the cells. For example, when the module 1 is positioned on the aquatic surface, the non-submerged portion of the tubular elements defining the frame 22 and the cross members 23 must have a height, relative to the water level, that is at least equal to a third, and preferably at least half, of the height of a ball. For example, the balls can have a diameter between 20 and 40 cm, and the non-submerged portion of the tubular elements and cross members can have a height greater than 10 cm, preferably greater than 15 cm.

The balls are preferably spherical to ensure better diffuse reflection of the incident light. They are preferably white in color or coated with a reflective material such as Mylar™ Alternatively, they may instead be coated with white paint, or have a silvery or golden surface provided by a coating or directly by the component material of the balls, for example metal.

In this embodiment, and as can be seen in FIG. 3, the floating framework 20 preferably comprises a frame 22 and a plurality of cross members 23, making it possible to define several cells where the balls are positioned, while stiffening the framework 20. Good stability is then obtained for the module.

This embodiment is very attractive economically, since it makes it possible to obtain good photovoltaic conversion efficiency while reducing the number of components of the module.

As a variant, the reflective device 40 is itself adapted to stabilize the floating module 1. In this regard, the reflective device 40 may comprise a tarpaulin 42 fixed to the framework 20.

The tarpaulin 42 is preferably highly reflective. For example, the tarpaulin may be white, either by being woven with white thread or by being painted white; or may be made of a highly reflective material, for example Mylar™.

Preferably, the reflective balls and/or the tarpaulin(s) are made or coated with a non-polluting material. For example, the use of materials containing titanium oxide TiO are avoided.

According to a first embodiment, the tarpaulin 42 is stretched over the floating framework so as to extend above the aquatic surface when the module 1 is placed thereon.

As in the example shown in FIG. 1, the floating framework may comprise several cells defined by the frame formed by the tubular elements and additional cross members (not visible in the figure). In this case, the reflective device 40 may comprise several tarpaulins 42, each tarpaulin being sized to cover a respective cell and being stretched over that cell.

The fact that a reflecting tarpaulin is stretched over the framework makes it possible both to significantly increase the reflection of light rays towards the lower face of the photovoltaic modules, and to stiffen the framework and therefore stabilize the module.

Figure 2A:
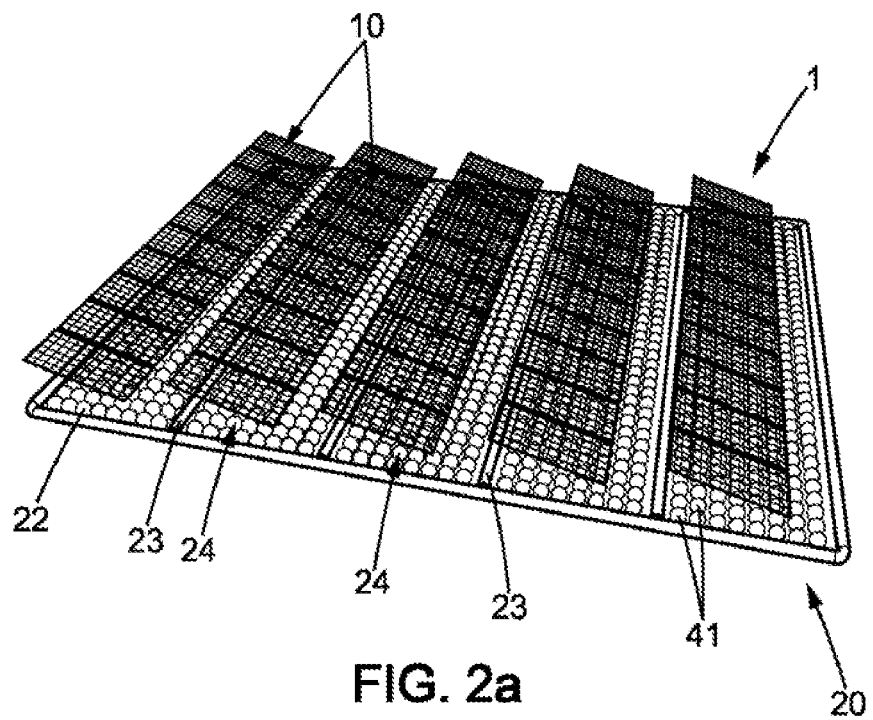
FIGS. 2a and 2b represent an example of a floating module according to a second embodiment.
Figure 2B:
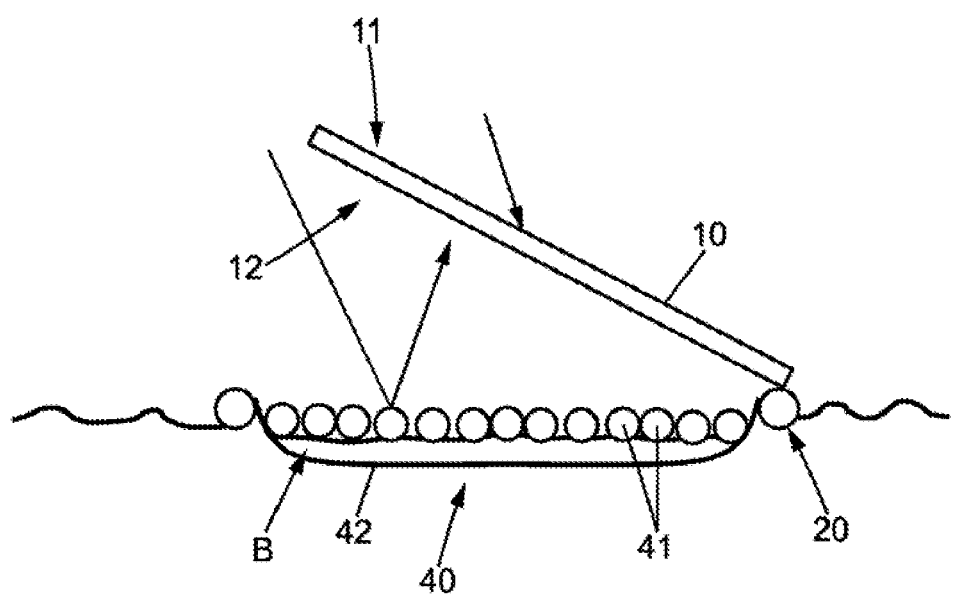

According to an alternative embodiment represented in FIGS. 2a and 2b, the tarpaulin 41 (not visible in FIG. 2a) is sized and fixed to the floating framework 20 so as to be able to receive a ballast of water B which makes it possible to stabilize the module. In this case, the tarpaulin is sized so that it can be stretched once a ballast of water, preferably between 5 and 15 cm in thickness, for example between 10 and 15 cm, is positioned on the tarpaulin. This makes it possible to stabilize the module while limiting the loss of the reflective properties (the albedo) of the tarpaulin related to the water.

However, to compensate for the loss of albedo of the tarpaulin related to the presence of the ballast, the reflective device 40 highly advantageously comprises floating reflective balls 42, placed on the ballast of water and contained by the edges of the tarpaulin 30, and where appropriate by the edges and/or cross members of the floating framework 10. For example, the floating balls 42 may be contained by the edges of the tarpaulin 30 on two opposite sides and by the edges or cross members of the floating framework 10 on the other two sides.

In this embodiment, the amount of reflection of the light rays on the lower face of the panels is increased by the tarpaulin and by the reflective balls, and the module 1 is stabilized by the ballast of water received on the tarpaulin.

The choice of one of the previously described embodiments results from a compromise between the mechanical stability obtained (which is optimal in cases where a tarpaulin is used), amplification of the reflection (which is optimal when spherical balls are used), and the economic criterion, the solution combining tarpaulin and balls being the most advantageous from the point of view of the former criteria but also the most expensive.

Figure 4:
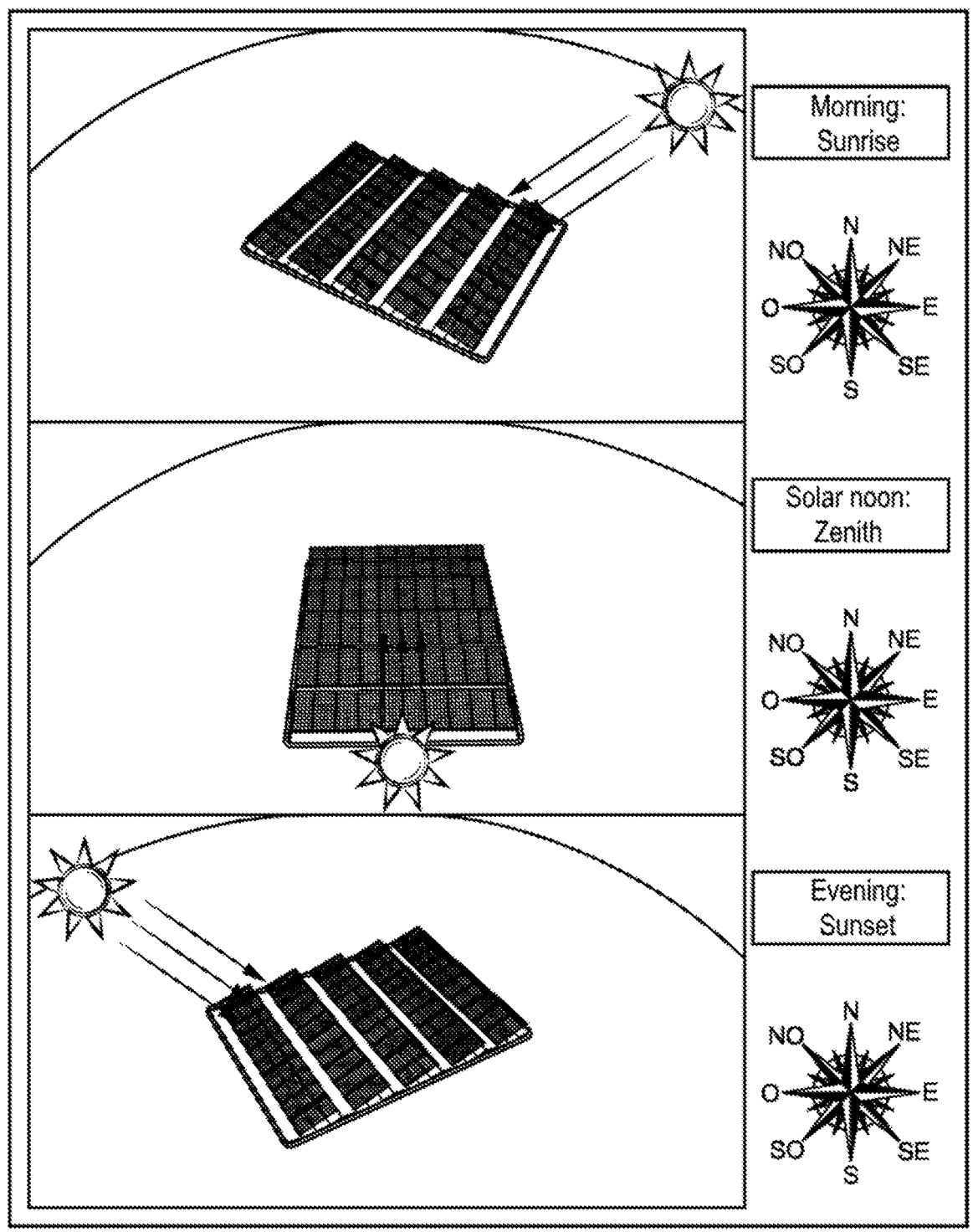
FIG. 4 represents an example of the sun azimuth tracking of a floating module.

Referring to FIG. 4, the module 1 advantageously comprises a device 50 for tracking the sun azimuth. This device 50 makes it possible to rotate the module 1 during the day so that the upper face of the panels is always directed towards the sun, in order to maximize the production of electrical energy from the panels.

Thus, as can be seen, the sun azimuth tracking device makes it possible to position the module so that the panels are facing towards the east in the morning, towards the south at midday, and towards the west in the evening.

Azimuth tracking devices 50 are well known to those skilled in the art, and are marketed by companies such as, for example, Upsolar, Mecasolar, Jsolar, etc.

Depending on the amount of electricity that one wishes to produce, several modules can be grouped to form a photovoltaic power station (not represented). In this case, the modules can be physically connected to each other by attachment means, possibly removable, and can be connected to a shared conversion device, suitable for converting the direct current produced by the photovoltaic panels into alternating current suitable for injection into the power grid.

Figure 5A:
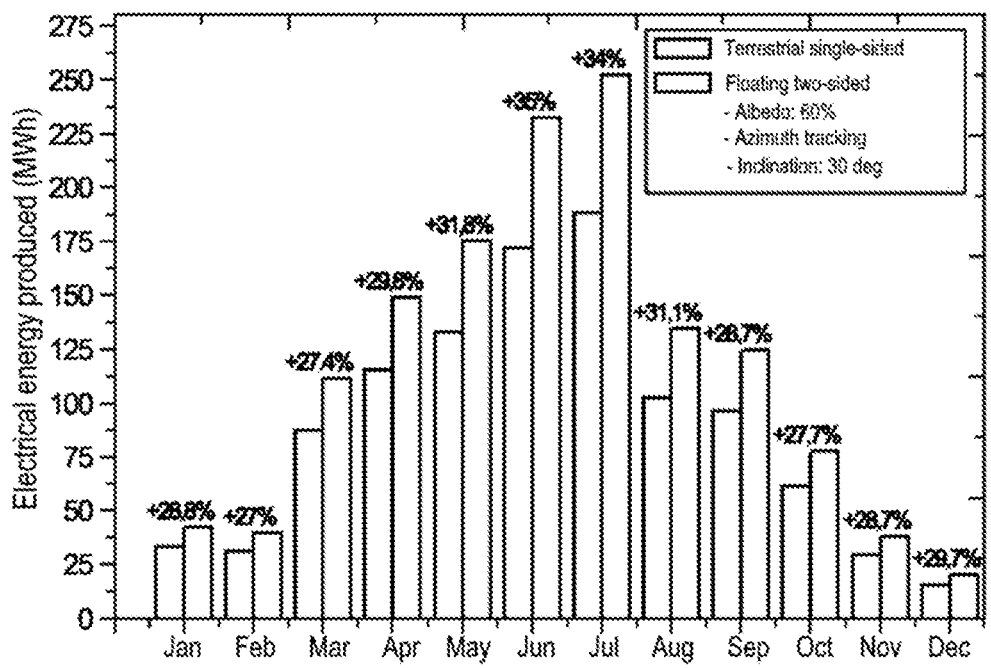
FIGS. 5a and 5b represent the relative gains in the monthly and annual electrical energy production, of a floating photovoltaic power station according to an exemplary embodiment compared to a terrestrial photovoltaic power station provided with single-sided panels.

Referring to FIG. 5a, the theoretical gain in efficiency between a photovoltaic power station created using floating modules according to an embodiment, and a terrestrial power station of equivalent power comprising single-sided panels, is represented.

This gain in efficiency has been modeled for an installed electrical power of 1 megawatt-peak. The power station has 175 strings, each comprising 18 two-sided photovoltaic panels of crystalline silicon, each having 350 watts-peak of power. The 18 panels of a string are distributed over 4 floating modules, for example two modules carrying 4 panels and two modules carrying 5 panels.

The floating power station is modeled for the following parameters:
The power station is placed on a lake where the water temperature is 16° C.,
The module comprises a reflective tarpaulin stretched over the framework in accordance with the example in FIG. 1,
The tarpaulin has an albedo of 60%,
The photovoltaic panels are inclined 30° relative to the surface of the water,
The panels are spaced 2.85 meters apart,
The modules comprise a sun azimuth tracking device.

The terrestrial power station used for the comparison has the same power and comprises the same number of strings and panels. The air temperature is considered to be is one degree higher than the lake temperature. In addition, the properties of the station are as follows:
The panels are single-sided,
The panels are inclined 15° relative to the surface of the ground,
The soil albedo is 20%,
The panels are spaced 2.5 meters apart,
The plant does not comprise a sun azimuth tracking device.

In FIG. 5a, a gain in efficiency is observed of 27% for the month of February, and 35% for the month of June, for an annual average of 31.2%.

It is important to note that these figures are obtained for a tarpaulin albedo of 60%, but this albedo may be even higher depending on the choice of material and/or the coating of the tarpaulin or of the reflective balls.

Figure 5B:
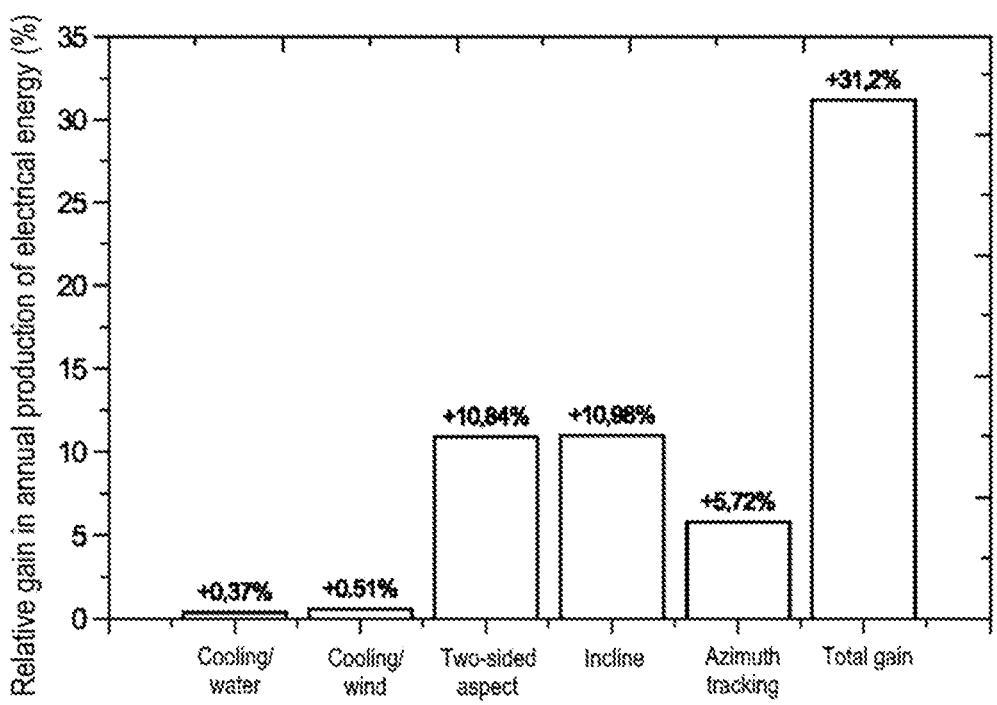

In FIG. 5b, the gain obtained by the use of the floating module has been broken down according to the different parameters of the module. In particular, one will note the importance of the two-sided aspect of the panels coupled with the use of the reflective device, since this is responsible for a gain in efficiency of 10.84%.

The tilting of the panels to 30° also allows an efficiency improvement of 10.98%.

The sun azimuth tracking device allows a gain of 5.72% compared to the terrestrial station.

Finally, one will note that the gain in productivity is not the sum of the gains resulting from the different parameters, but is greater than this sum, so that the existence of a synergy between factors affecting the total gain in photovoltaic energy production can be deduced from this.

The invention claimed is:

1. A floating module for producing electricity, comprising:
at least one photovoltaic panel, and
a floating framework on which the panel is mounted,
wherein the photovoltaic panel comprises an upper face and a lower face which are capable of generating electricity by photovoltaic effect, and wherein the floating module further comprises a plurality of reflective balls that float by themselves contained within at least one cell defined by the floating framework and are capable of reflecting light rays towards the lower face of the panel.

2. The floating module according to claim 1, wherein the floating framework comprises a plurality of tubular elements connected to one another so as to define the at least one cell.

3. The floating module according to claim 1, further comprising a tarpaulin fixed to the framework.

4. The floating module according to claim 3, wherein the tarpaulin is reflective.

5. The floating module according to claim 4, wherein the tarpaulin is stretched over the framework so as to extend above the surface of the water when the module is placed on the water.

6. The floating module according to claim 3, wherein the tarpaulin is shaped to receive a ballast of water, and the floating reflective balls are contained by edges of the tarpaulin and/or by the floating framework.

7. The floating module according to claim 1, further comprising a sun azimuth tracking device, capable of rotating the module or the panel according to the azimuth of the sun.

8. The floating module according to claim 1, wherein each photovoltaic panel extends at an angle between 0 and 40° relative to the horizontal.

9. A photovoltaic power station, comprising a plurality of floating modules according to claim 1.

10. The floating module according to claim 4, wherein the tarpaulin is shaped to receive a ballast of water, and the plurality of floating reflective balls are contained by edges of the tarpaulin and/or by the floating framework.

11. A floating module for producing electricity, comprising:
    at least one photovoltaic panel, and
    a floating framework on which the panel is mounted,
    wherein the photovoltaic panel comprises an upper face and a lower face which are capable of generating electricity by photovoltaic effect, and wherein the floating module further comprises a reflective tarpaulin fixed to the framework capable of reflecting light rays towards the lower face of the panel and which is adapted to stabilize the floating module.

12. The floating module according to claim 11, wherein the tarpaulin is stretched over the framework so as to extend above the surface of the water when the module is placed on the water.

13. The floating module according to claim 11, wherein the tarpaulin is shaped to receive a ballast of water, and the floating module further comprises a plurality of floating reflective balls contained by edges of the tarpaulin and/or by the floating framework.

14. The floating module according to claim 11, further comprising a sun azimuth tracking device, capable of rotating the module or the panel according to the azimuth of the sun.

15. The floating module according to claim 11, wherein each photovoltaic panel extends at an angle between 0 and 40° relative to the horizontal.

16. A photovoltaic power station, comprising a plurality of floating modules according to claim 11.

17. A floating module for producing electricity, comprising:
    at least one photovoltaic panel comprising an upper face and a lower face which are capable of generating electricity by photovoltaic effect;
    a floating framework on which the panel is mounted; and
    a reflective tarpaulin fixed to the framework and shaped to receive a ballast of water and a plurality of floating reflective balls contained by edges of the tarpaulin and/or by the floating framework, the reflective tarpaulin and the floating reflective balls being capable of reflecting light rays towards the lower face of the panel.

\* \* \* \* \*